United States Patent [19]

Colucci

[11] 3,822,915

[45] July 9, 1974

[54] SAFETY SEAT BELT HAVING FOUR FASTENING POINTS, FOR A MOTOR CAR SEAT

[75] Inventor: Ivo Colucci, Milan, Italy

[73] Assignee: Alfa Romeo S.p.A., Milan, Italy

[22] Filed: May 4, 1972

[21] Appl. No.: 250,170

[30] Foreign Application Priority Data
May 6, 1971   Italy.................................. 24189/71

[52] U.S. Cl. ............................................... 297/389
[51] Int. Cl. ..... A47c 31/00, A47d 1/00, B60r 21/10
[58] Field of Search ........... 297/385, 386, 387, 388, 297/389, 390, 384; 281/150 SB

[56] References Cited
UNITED STATES PATENTS
3,306,662   2/1967   Finnigan............................. 297/389

| 3,454,304 | 7/1969 | Hudak .............................. 297/389 |
| 3,528,702 | 9/1970 | Boedigheimer................ 297/389 X |
| 3,620,569 | 11/1971 | Mathis .............................. 297/388 |
| 3,667,806 | 6/1972 | Sprecher........................... 297/388 |
| 3,700,281 | 10/1972 | Servadio ........................... 297/390 |
| 3,713,694 | 1/1973 | Miller ................................ 297/389 |
| 3,717,216 | 2/1973 | Rothschild........................ 297/388 |
| 3,722,951 | 3/1973 | Ezqherer........................... 297/390 |

*Primary Examiner*—Paul R. Gilliam
*Assistant Examiner*—G. O. Finch
*Attorney, Agent, or Firm*—Holman & Stern

[57] ABSTRACT

A safety belt having four anchoring points in which there is provided an abdominal strap connected to a swinging frame pivoted on the seat's sidewalls, and two paired shoulder straps which are connected to sliding members placed on the abdominal strap and are connected at the other end, to the top corners of the seat back.

12 Claims, 8 Drawing Figures

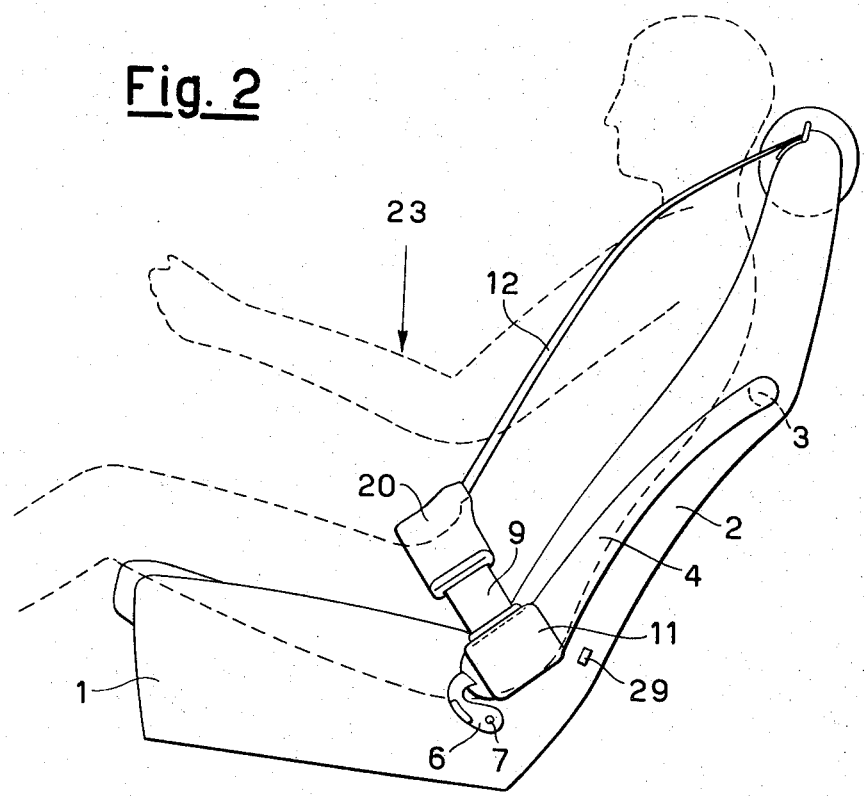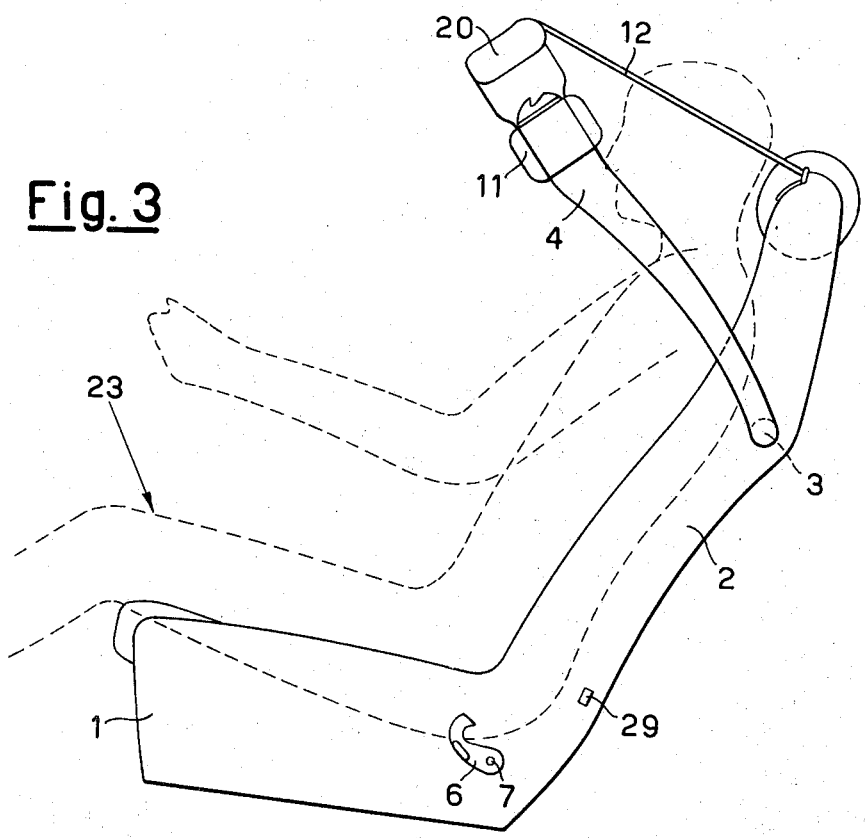

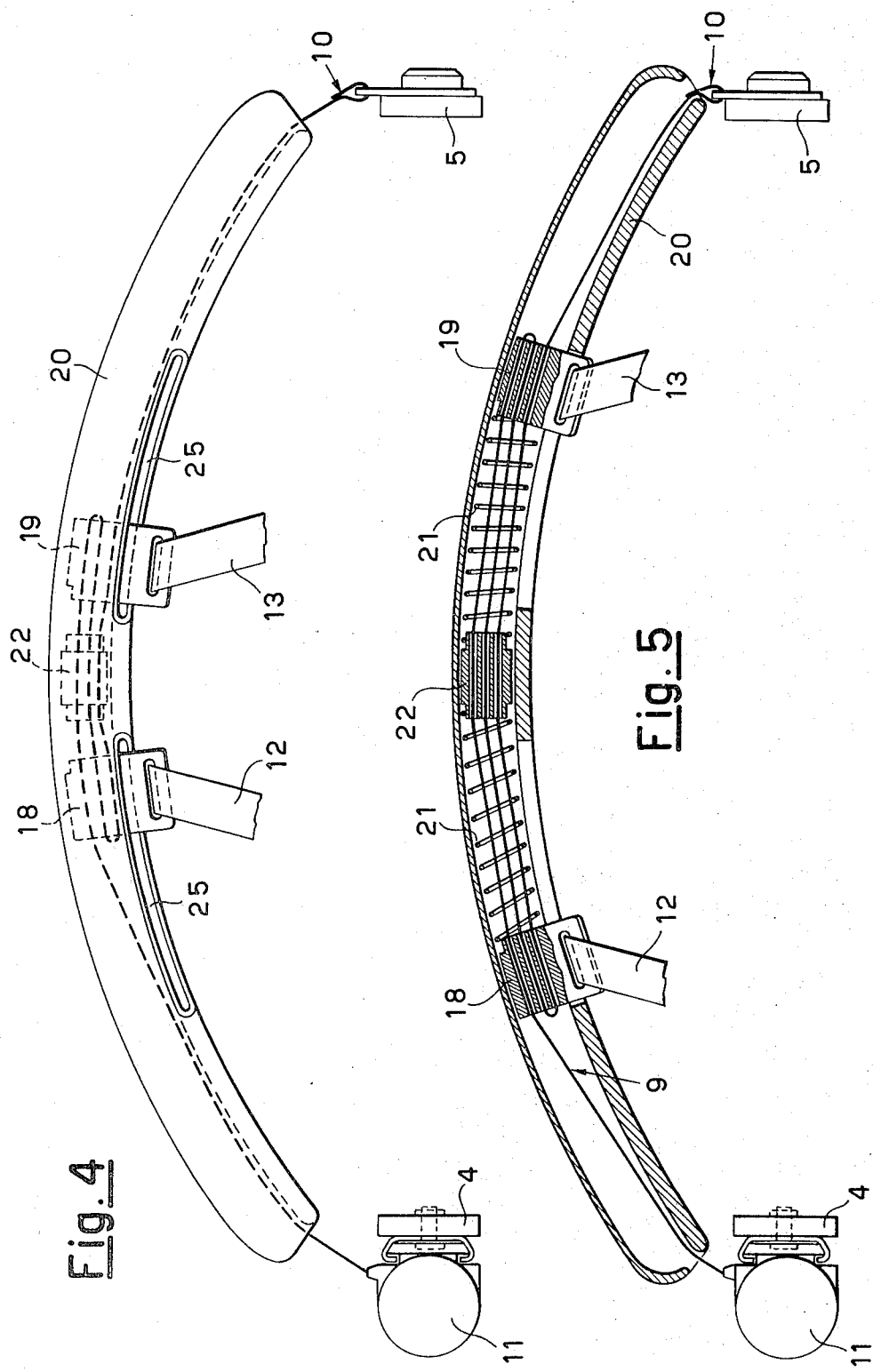

SAFETY SEAT BELT HAVING FOUR FASTENING POINTS, FOR A MOTOR CAR SEAT

BACKGROUND OF THE INVENTION

This invention relates to a seat belt adapted to retain a passenger on the seat of a motor vehicle, more particularly when the vehicle is subjected to quick speed differentials.

PRIOR ART

A number of types of said belts are known, which wrap in different ways about the passenger's body and are removably fastened either to the seat or to the vehicle body.

It is well known, however, that both the driver and the passengers, due to their intolerance against the impression of constraint they can receive from the presence of the seat belts, or also due to the intricacy of the controls of the fastening and releasing mechanism of the belts, often refuse to use the belts, thus exposing themselves to serious injuries as caused by a shock or even only a sudden deceleration of the vehicle in which they are travelling.

OBJECTS AND SUMMARY OF THE INVENTION

An object of the present invention is to provide a safety belt which can be both worn or released with an extremely simple manipulation.

An additional object is to persuade the passenger to wear the belt, by rendering the belt particularly obtrusive when in the inoperative position.

An important feature of the safety belt according to the present invention is not to provide for a fastening and releasing mechanism positioned along the belt and thus, on account of the flexibility of the belt, in a position which cannot be promptly determined for a quick release especially under emergency conditions.

The safety device according to this invention retains the passenger on the seat by means of a transverse strap acting on the abdomen and a couple of suspenders-like straps which start from the transverse strap and are directed towards the top corners of the seat back to wrap about the wearer's chest and are then connected to fixed points of the vehicle. According to the present invention the abdominal strap is affixed to the ends of two arms pivoted to the top portion of the seat and movable on the planes of the seat sidewalls, with said suspenders-like straps being fastened to members allowed to slide on the transverse strap.

According to a preferred embodiment, the slidable members are urged one against the other in a substantially central position of the transverse strap, by the tension of the suspenders-like strap.

Further advantages and features of the device according to the present invention will become more clearly apparent from the ensuing description of two exemplary embodiments as illustrated in the accompanying drawings, wherein:

BRIEF DESCRIPTION OF THE DRAWINGS

FIGS. 2 and 3 are side elevational views of the device in two different positions;

FIG. 4 is a view in elevation showing a detail of the device;

FIG. 5 is a view partly in cross-section and partly in elevation of the detail shown in FIG. 4 in a different position;

DETAILED DESCRIPTION OF THE EMBODIMENTS

Figure 1:
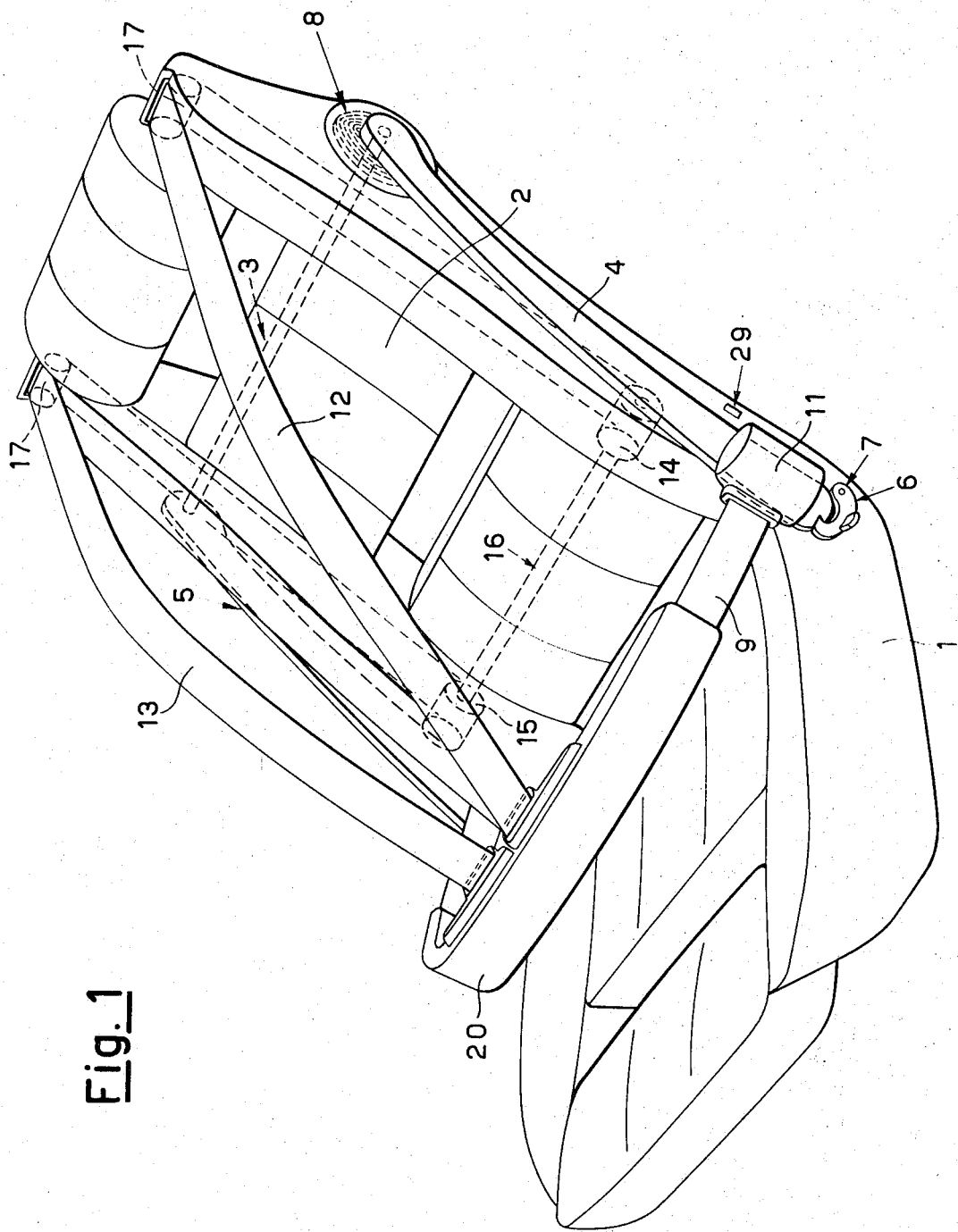
FIG. 1 is a perspective view of a first exemplary embodiment of the device according to the present invention as mounted on a vehicle seat.

FIGS. 1 and 2 show a seat 1 having a back 2 on which is rotatably supported an arbor 3 to which arms 4 and 5 are keyed. Each of these arms is engaged, when in the position shown in the drawings, by a detent hook 6 which can be released by rotation about a pivot point 7. A coiled spring 8 resiliently acts on the arm 4 in the sense of rotating the arm 4 clockwise as viewed in FIG. 2. An abdominal strap 9 is affixed to the arms 4 and 5 as best seen in FIG. 5, showing in detail a top view of an abdominal strap. The abdominal strap comprises the flexible strap 9 affixed at one end at 10 to the arm 5 and, at the other end is resiliently taken up by a recoiler 11 mounted on the arm 4.

Preferably, the recoiler 11 is of the inertia type and is a mechanism of quite conventional configuration and currently used in the application of flexible seat belts for motor cars. In such a device, a mechanism resiliently takes up the belt, by pulling it inwardly under a preselected tension and allowing it to be slowly paid off gradually with slight speed variations. When the belt, conversely, is suddenly pulled out with a jerking action, suitable means prevent its sliding. Thus, the belt is unwound when recalled by gentle movements of the passenger, but it is locked to hold him when he is jerkily projected forward and tends to be separated from the seat back.

Two suspenders-like straps 12 and 13 are recalled by recoilers as diagrammatically shown at 14 and 15. These recoilers release the straps evenly inasmuch as they are connected by a rotatable arbor 16. The straps slide over idle rollers 17 and are finally affixed to sliders 18 and 19, movable within a sheath 20 for the strap 9.

As best seen in FIG. 5, the members 18 and 19 are moved against the bias of compression springs 21 which react one against the other with the insertion of a member 22 therebetween. The strap 19 runs in a zigzag fashion between said members which make up a three-lap tackle and whose stroke is limited by slots 25.

The operation of the device as shown in the drawings will now be briefly described.

FIGS. 1, 2 and 4 show the device as it is positioned when a passenger is seated on the seat and wears the belt. The passenger is diagrammatically shown by a dotted line at 23 in FIGS. 2 and 3, and in FIGS. 1 and 4 has not been shown in order not to overcrowd the drawing.

The sheath 20 rests on the passenger's abdomen and the recoiler 11 recalls the strap 9 resiliently with a predetermined bias so that the strap slides within the sliders 18 and 19 acting as pulleys and draws the sliders to one another as shown in FIG. 4. Also, the recoilers 14 and 15 draw the suspenders-like straps 12 and 13 so as to keep them adhering to the body of the passenger. On account of the functional features of the recoilers, as explained above, the passenger is held against sudden forward movements.

In order to become free of the straps, the passenger disengages the hooks 6 from the arms 4 and 5 and these can be positioned as shown in FIG. 3. It is necessary to emphasize, at this stage, that the recoiler 11 has a recoiling stroke which is interrupted at a position corresponding to a position of the sheath 20 as determined by the passenger having the slightest body size in view, when the arms are lowered and the sliders 18 and 19 are drawn to one another. However, as the arms 4 and 5 are lifted, they pass over the passenger's body and the strap 9 is released farther without being rewound by the recoiler 11, with the latter having reached its dead center position.

Thus, when the strap 9 is slackened, the members 18 and 19 are pushed away from one another as shown in FIG. 5. More particularly, they are in such a position when the arms 4 and 5 are arranged as shown in FIG. 3.

The consequent mutual positioning of the straps 12 and 13 away from one another allows the same not to interfere with the passenger's face when the arms are further lifted to a position which is substantially vertical and which position has not been shown in the drawings.

In quite a similar way, to wear the belt, the passenger lowers the arms 4 and 5 from the vertical position until the sheath 20 rests on the wearer's abdomen. When continuing the lowering movement, the strap 9 is tensioned and draws the sliders 18 and 19 towards the substantially central position, then it is paid off from the recoiler to allow the arms 4 and 5 to engage the hooks 6.

Many modifications can be introduced in the embodiment described above by way of example: for instance, the recoiler 11 fastened to the arm 4 can be replaced by a conventional device permitting the belt to be hooked to any appropriate position selected among a plurality of possible positions, so that the length of the strap can be adapted, wherever necessary, to the body size of a wearer.

Also the recoilers 14 and 15 can be replaced, in quite an analogous manner and affixed to any other appropriate point, also on the vehicle body.

Figure 6:
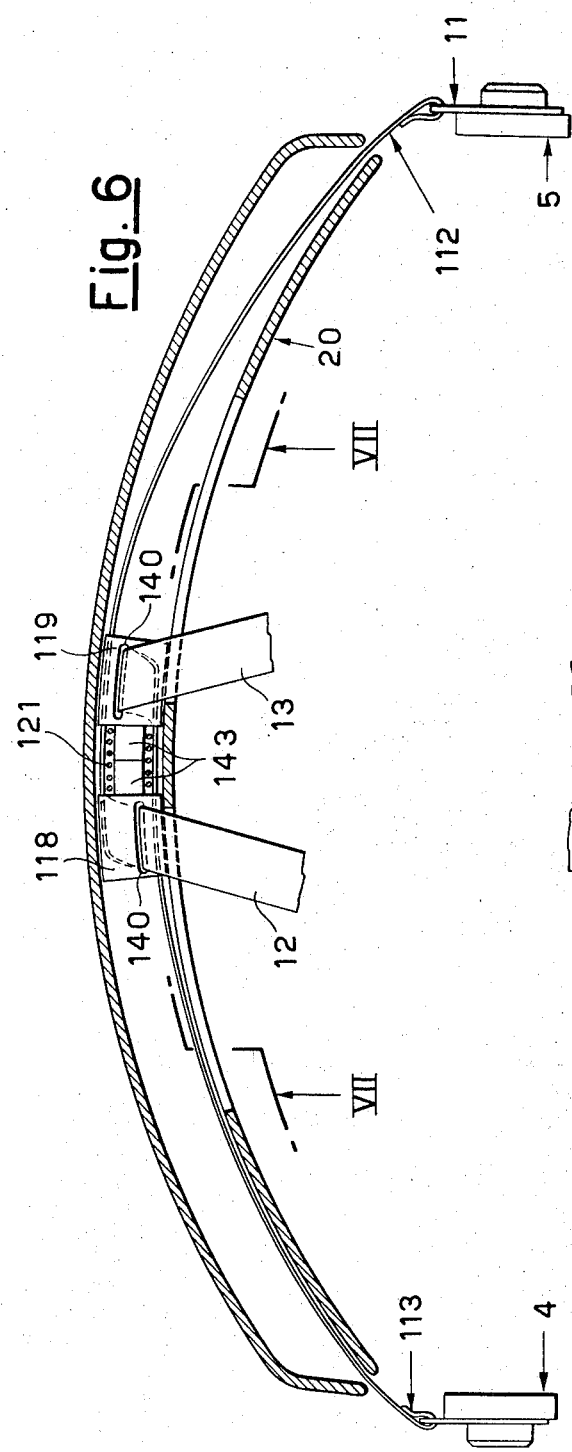
FIG. 6 is a view taken along the line VI—VI of FIG. 7 of a detail of a second embodiment.
Figure 7:
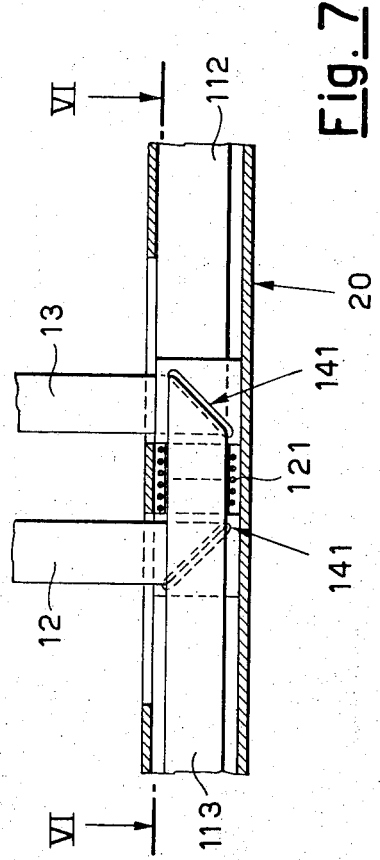
FIG. 7 is a view taken along the line VII—VII of FIG. 6.
Figure 8:
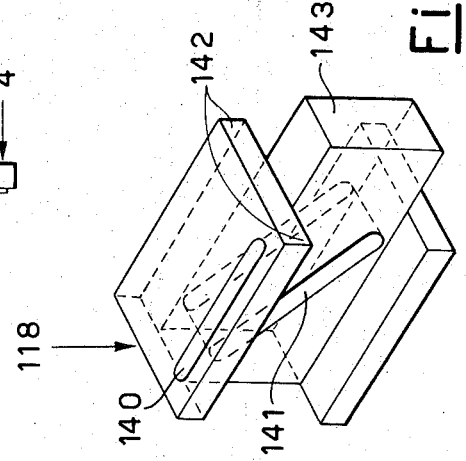
FIG. 8 is an axonometrical view of a component part.

An alternative embodiment of the safety belt according to the invention is illustrated in FIGS. 6, 7 and 8.

FIG. 6 is a cross-sectional view, similar to FIG. 5, which shows how the transverse strap can be made up by extensions of the suspenders-like straps.

In FIG. 6, within the sheath 20 pads 118 and 119 are slidable, and between which pads a spring 121 is compressed. The strap 12 enters a slot 140 of the top face of the pad 118, then a sloping slot 141 and is extended into the sheath 20 into a branch 112 fastened at its end to the arm 5.

FIG. 8 shows in greater detail the configuration of the pad 118 in which tabs 142 are provided, in correspondence with which the pad slides on the guideway 20. On the pad 118, there is, in addition, an abutment 143 which limits the approaching stroke of the pad 118 towards the pad 119 and thus the compression of the spring 121. As shown, the pad 119 is equal to the pad 118 but is differently mounted in the sheath 20.

The strap 13 passes into the pad 119 and is extended by a branch 113 affixed at one end to the arm 4. Between the tabs 142 of the pads there are passageways between the pads and the sheath 20 which allow the branches 112 and 113 of the straps freely to slide.

The operation of the belts as illustrated in FIGS. 6 and 8 will now be briefly described, on considering that the component parts not shown in such figures are similar to those which appear in FIGS. 1 to 5.

The spring 121 imparts a repelling force to the pads 118 and 119, which is sufficiently slight so as to be overcome by the forces imparted to the pads by the straps 12 and 13, when the arms 4 and 5 are lowered in their working positions. Under these conditions, in point of fact, the matched recoilers 14 and 15 draw the straps 12 and 13 with a certain drag. During lifting of the arms, the suspenders-like straps are taken up by the recoilers and these, due to their resilient action, decrease their pull, so that, starting from an approrpiate position, for example a horizontal position, of the arms 4 and 5, the action of the straps on the pads 118 and 119 is no longer capable of overcoming the bias of the spring 121 which thus sets the pads apart from one another so that the straps 12 and 13 are set apart and do not obtrude the passenger's head when the arms 4 and 5 are in an almost vertical position, as above explained.

In order to acquire a greater degree of safety, an end of stroke abutment can be provided for the recoilers 14 and 15, so that, when the arms 4 and 5 are almost fully lifted, their recoiling action is discontinued and they may allow the straps 12 and 13 to be slackened and the spring 121 can be expanded unhindered.

It may be wise to provide that the end portion of the branches 112 and 113 of the suspenders-like straps be properly stiffened, in the vicinity of their points of attachment to the arms 4 and 5, respectively, so as easily to support the sheath 20 when the arms 4 and 5 are lifted to a substantially horizontal position.

A number of appropriate different mechanically equivalent configurations can be provided for the holding hooks 6 and their release controls, which preferably will be a single one and placed near the vehicle door.

Appropriate switching means, diagrammatically indicated at 29 in FIG. 1, can advantageously integrate the device to control the cut-off of the current supply to the car engine when the arms 4 and 5 are lifted. For example, if the vehicle is driven by an internal combustion engine of the Otto cycle type, the means 29 can supply its ignition circuitry only when the arms 4 and 5 are engaged by the hooks 6. As an alternative, the current supply may be allowed only under the above specified conditions to the engine starting motor.

Possibly the means 29 can connect, as a possible additional alternative, when the arms 4 and 5 are lifted, the ignition circuit with a sound warning signal internal of the vehicle and whose sound is annoying for the occupants.

It can be easily understood that the passengers and the driver are persuaded to wear the belts if, due to the action of the means 29, the arms must be lowered as the vehicle is running. The sheath 20 would, in fact, make it inconvenient to use the seat 1, unless the belt is worn when the arms are lowered.

On the other hand, the safety device according to the present invention makes it extremely convenient to fasten the passenger to the seat, since all that is required is only to depress the arms 4 and 5 until engaging the arms in their respective anchoring means and such an easy manipulation leads the passenger to wear the belt.

What is claimed is:

1. A safety device for holding a passenger on a seat of a vehicle including a flexible transverse belt acting on the passenger's abdomen and a couple of flexible suspender-like belts, each belt having a top portion and a bottom portion, each belt being connected at its bottom portion to the transverse belt and at its top portion to fixed points of the vehicle, said suspender-like belts wrapping with the substantially verticle arrangement the passenger's chest, the improvement comprising two arms pivoted to a top portion of the seat back, said arms being movable only in the planes of the sidewalls of the seat back, from a substantially vertical lifted at rest position to a lowered working position aligned with said seat back and releasable means retaining said arms in their lowered working position, said transverse belt held between the free ends of said arms, said transverse belt being defined by two members one of which is slidable.

2. The device according to claim 1, characterized that said suspender-like belt is connected at its bottom portion to said slidable member, said members defining pulleys on which said belt slides and are urged to approach one another when said transverse belt is tensioned.

3. The safety device according to claim 2, characterized in that said slidable members are urged one against the other against the bias of resilient means.

4. The safety device according to claim 2, characterized in that said transverse slidable members are guided by a semirigid sheath slidably connected to said belt.

5. The safety device according to claim 4, characterized in that said sheath has a tubular shape and said members and said belt slide in its interior.

6. The safety device according to claim 1, characterized in that said arms are connected so as to rotate integrally and concurrently.

7. The device according to claim 1, characterized in that said transverse belt is alternatingly wound on slidable members which define a pulley for the belt so as to make up a three-lap tackle, so that when the flexible belt is tensioned, the slidable members approach one another.

8. The device according to claim 2, characterized in that each of said suspenders-like belts is wound on the one of said members which is placed on the same side of the seat and is extended for being affixed to that arm which is placed at the opposite side of the seat.

9. The safety device according to claim 7, characterized in that said transverse flexible belt is connected to at least one of the ends of said arms through a resilient recoiling means of the inertia locking type.

10. The safety device according to claim 1, characterized in that the suspenders-like straps are connected to the vehicle substantially in correspondence with the top corners of the seat by inertia locking type recoiling mechanisms.

11. The safety device according to claim 10, characterized in that said recoiling mechanisms for said suspenders-like straps are connected so as to be simultaneously wound and paid off.

12. The safety device according to claim 1, characterized in that said suspenders-like straps slidably connect at the top to the top corners of the seat back and are extended so as to be wound by recoiling mechanisms of inertia locking type.

* * * * *